United States Patent
Cooper

(10) Patent No.: US 9,040,205 B2
(45) Date of Patent: May 26, 2015

(54) PROTECTION OF POROUS CARBON FUEL PARTICLES FROM BOUDOUARD CORROSION

(75) Inventor: John F. Cooper, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 186 days.

(21) Appl. No.: 13/525,795

(22) Filed: Jun. 18, 2012

(65) Prior Publication Data
US 2012/0328966 A1    Dec. 27, 2012

Related U.S. Application Data

(60) Provisional application No. 61/499,568, filed on Jun. 21, 2011.

(51) Int. Cl.
*H01M 8/06* (2006.01)
*H01M 8/14* (2006.01)
*H01M 8/22* (2006.01)

(52) U.S. Cl.
CPC .......... *H01M 8/06* (2013.01); *H01M 2008/147* (2013.01); *H01M 8/145* (2013.01)

(58) Field of Classification Search
CPC .. H01M 8/06; H01M 8/145; H01M 2008/147
USPC .......................... 429/408, 423, 476, 458, 464
See application file for complete search history.

(56) References Cited

U.S. PATENT DOCUMENTS

| | | | |
|---|---|---|---|
| 5,776,633 A * | 7/1998 | Mrotek et al. | 429/231.8 |
| 6,815,105 B2 | 11/2004 | Cooper et al. | |
| 6,878,479 B2 | 4/2005 | Cooper et al. | |
| 8,153,328 B2 | 4/2012 | Cooper | |
| 2002/0106549 A1 | 8/2002 | Cooper et al. | |
| 2003/0017380 A1 * | 1/2003 | Cooper et al. | 429/46 |
| 2009/0023041 A1 | 1/2009 | Cooper | |

FOREIGN PATENT DOCUMENTS

RU          87833      10/2009

OTHER PUBLICATIONS

Cooper JF et al., "Analysis of the carbon anode in direct carbon conversion fuel cells," International Journal of Hydrogen Energy, pp. 1-10 (2012).

* cited by examiner

*Primary Examiner* — Kenneth Douyette
(74) *Attorney, Agent, or Firm* — Eddie E. Scott

(57) ABSTRACT

A system for producing energy that includes infusing porous carbon particles produced by pyrolysis of carbon-containing materials with an off-eutectic salt composition thus producing pore-free carbon particles, and reacting the carbon particles with oxygen in a fuel cell according to the reaction $C+O_2=CO_2$ to produce electrical energy.

6 Claims, 4 Drawing Sheets

PROTECTION OF POROUS CARBON FUEL PARTICLES FROM BOUDOUARD CORROSION

CROSS-REFERENCE TO RELATED APPLICATIONS

This application claims benefit under 35 U.S.C. §119(e) of U.S. Provisional Patent Application No. 61/499,568 filed Jun. 21, 2011 entitled "Protection of porous carbon fuel particles from Boudouard Corrosion," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to porous carbon fuel particles and more particularly to protection of porous carbon fuel particles from Boudouard corrosion.

2. State of Technology

U.S. Pat. No. 8,153,328 for carbon fuel cells with carbon corrosion suppression issued Apr. 10, 2012 to John F. Cooper provides the following information on the state of technology:

"Direct Carbon Conversion (DCC) fuel cells and batteries make use of carbon anodes in the form of porous plates or paste-like powders of carbon particles mixed with molten salts at 650-850 C. Near to the reacting interface, the anode reaction is typically $C+2CO_3^{2-}=3CO_2+4e^-$. This reaction yields $CO_2$ (and not CO) because the anode surface is polarized and covered with an adherent layer of R—CO functional groups that inhibit the anodic reaction on an otherwise bare surface that would yield CO. Evolution of CO (and not $CO_2$) would cut the total electrochemical efficiency roughly in half. Far from the reacting surface, Boudouard corrosion ($C+CO_2=2CO$) takes place, reducing the total electrochemical efficiency by a factor of two."

"During the refueling of a fuel cell (and the manufacture of carbon primary batteries), the fuel cell anode chamber is filled with carbon that will be reacted over an extended period of time. The reaction of the carbon in the reaction zone extending a few millimeters from the anode current collector into the bulk of the carbon produces $CO_2$. It is important that this $CO_2$ not be allowed to flow through or pass over that portion of the carbon that is not polarized. A system for exhausting the carbon dioxide from the anode chamber without flowing through the bulk of the unreacted carbon fuel is needed to bring the system to maximum efficiency. Further, some CO will invariably be produced by contacting the carbon with the $CO_2$ or by electrochemical reaction at currents below those required for polarization. A system for recovering the energy associated with the formation of CO is also helpful in achieving maximum efficiency of the cell."

U.S. Pat. No. 6,815,105 for a fuel cell apparatus and method thereof issued Nov. 9, 2004 to John F. Cooper, Roger Krueger, and Nerine Cherepy provides the following information on the state of technology:

"High temperature, molten electrolyte, electrochemical cells have been shown to be an efficient method of producing energy particularly when the fuel source is hydrogen gas. Carbon as a fuel source in electrochemical cells has been explored. Efficiencies of various carbon sources have been calculated based on half-cell data and have consistently been low, e.g., 50% or less."

"Aspects of the invention include a high temperature, molten electrolyte electrochemical cell comprising ash-free, turbostratic carbon particles."

"Another aspect of the invention includes a high temperature, molten electrolyte, electrochemical cell for directly converting a carbon fuel to electrical energy, the electrochemical cell comprising a cathode compartment having an oxygen-containing gas and a molten electrolyte; an anode compartment having a slurry comprising the molten electrolyte and carbon particles entrained in the molten electrolyte; and an electron insulating, ion conducting, porous ceramic separator between the cathode compartment and the anode compartment."

"Another aspect of the invention includes a high temperature, molten electrolyte electrochemical cell for directly converting a carbon fuel to electrical energy, the electrochemical cell comprising a cathode compartment formed by a housing comprising non-porous, inert material having a gas inlet and outlet, an oxygen-containing gas, a molten electrolyte, and a cathode current collector; an anode compartment having an inlet, an anode current collector, and a slurry comprising the molten electrolyte and carbon particles entrained in the molten electrolyte; and an electron insulating, ion conducting, porous ceramic separator between the cathode compartment and the anode compartment, the porous ceramic separator capable of allowing transport of ions produced in the cathode compartment to the slurry."

"Another aspect of the invention includes a method for producing electrical energy, the method comprising the steps of heating an electrochemical cell containing a carbon fuel entrained in an electrolyte to an operating temperature; producing carbonate ions by bringing an oxygen-containing gas in contact with a cathode current collector wetted with molten carbonate; transporting the carbonate ions through a porous ceramic separator to an anode current collector; reacting the carbonate ions with the carbon fuel; and collecting the electrical energy produced through the anode current collector."

U.S. Pat. No. 6,878,479 for a tilted fuel cell apparatus issued Apr. 12, 2005 to John F. Cooper, Nerine Cherepy, and Roger Krueger provides the following information on the state of technology:

"An aspect of the invention includes an apparatus comprising: an anode current collector; a cathode current collector; a porous ceramic separator, wherein the separator is sandwiched between the cathode current collector and the anode current collector and the anode current collector is at a higher elevation than the cathode current collector; an anode plate and rib assembly comprising a plate and a plurality of ribs, wherein the anode plate and rib assembly is positioned such that the ribs are electrically connected to the anode current collector to form a plurality of anode channels; a cathode plate and rib assembly comprising a plate and a plurality of ribs, wherein the cathode plate and rib assembly is positioned such that the ribs are electrically connected to the cathode current collector to form a plurality of cathode channels; means for entry to the anode channels of a plurality of particles, wherein the particles consist essentially of carbon, electrolyte, or mixtures thereof; means for entry of a gas containing both oxygen and carbon-dioxide to the cathode channels; means for exit of carbon dioxide gas and excess molten electrolyte from the anode channels; and means for exit of gaseous byproducts and excess molten electrolyte from the cathode channels, wherein the cell assembly is substantially planar and rectangular and tilted at an acute angle to the horizontal in a configuration such that the means of entry are positioned at a higher elevation than the means of exit and that the anode plate and rib assembly is positioned at a higher elevation than the cathode plate and rib assembly."

"Another aspect of the invention includes An apparatus comprising: at least two bipolar, high temperature, molten electrolyte cell assemblies, wherein each cell assembly comprises: a porous ceramic separator; a cathode current collector; an anode current collector, wherein the separator is sandwiched between the cathode current collector and the anode current collector and the anode current collector is at a higher elevation than the cathode current collector; a cathode plate and rib assembly comprising a plate and a plurality of ribs, wherein the cathode plate and rib assembly is positioned such that the ribs are in contact with the cathode current collector and form a plurality of cathode channels; an anode plate and rib assembly comprising a plate and a plurality of ribs, wherein the anode plate and rib assembly is positioned such that the ribs are in contact with the anode current collector and form a plurality of anode channels; means for entry to the anode channels of a plurality of particles, wherein the particles consist essentially of carbon, electrolyte, or mixtures thereof; means for entry of a gas containing oxygen and carbon-dioxide to the cathode channels; means for exit of carbon dioxide gas from the anode channels; and means for exit of gaseous byproducts from the cathode channels, wherein the cell assembly is substantially planar and rectangular and tilted at an acute angle to the horizontal in a configuration such that the means of entry are positioned at a higher elevation than the means of exit; and wherein the cell assemblies are connected in electrical series."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention makes possible the efficient use of porous carbon particles and rigid porous electrodes in DCFC at high efficiencies by providing for the isolation of the interior of the particles from ambient carbon dioxide, thus preventing loss of carbon to the parasitic Boudouard corrosion reaction. This allows coulombic efficiencies to approach in the limit 100%, so that the total conversion efficiency approaches the voltage efficiency of the polarized cell, about 70-80%. (The voltage efficiency is the ratio of cell voltage to the theoretical limit, 1.02 V. The coulombic efficiency is the ratio of the number of electrons transferred per atom of carbon, n, divided by the ideal number, n=4. The total efficiency is the product of these two ratios. This definition assumes that any CO byproduct is not used to produce electrical energy.) Such high efficiencies would benefit the direct electrochemical generation of electric power from elemental carbon derived from carbonaceous fossil fuels such as coal, natural gas or petroleum, or from renewable biological energy sources such as plant material in the form of charcoal, charred waste paper, pyrolyzed forestry or agricultural byproducts, etc.

The present invention provides a system for producing energy. The system includes infusing porous carbon particles with an off-eutectic salt composition producing substantially pore-free carbon particles, and electrochemically reacting the carbon particles with oxygen according to the net cell reaction $C+O_2=CO_2$ to produce electrical energy.

The off-eutectic composition is selected such that the infused off-eutectic salt composition has a melting point higher than the operating temperature of the cell, and thus remains solid and impervious to gas transport or melt flow or electrical current. As the carbon particle is oxidized by anodic reaction, now confined to the outer surface of the particle, the carbon is converted to gaseous or dissolved carbon dioxide and the melt/carbon interface is displaced toward the interior of the particle. This displacement exposes solid off-eutectic material to the melt, and the solid merely dissolves into the melt without melting. If the porous carbon material in the cell is divided into two or more batches, each having been produced with a correctly chosen off-eutectic composition, then the dissolution of the solid material at the particle surface from the batches may produce the same composition of the operating melt, which composition becomes invariant.

It is to be understood that "off-eutectic composition" refers, first, to any composition or set of compositions that have the same constituents as the molten electrolyte but differing proportions that result in a melting point temperature that is higher than the temperature of operation of the cell. Second, the constituents of the pore-fillers may be altogether different from those of the electrolyte provided that they melt at a higher temperature than the temperature of operation of the cell, provided the pore filler material is compatible with the operation of the cell. Finally, it is understood that the pore-filling material may be other than a salt, e.g., it may be the pyrolyzed products of a hydrocarbon or organic material that are poorly wetted by the salt and may provide a barrier to transport of ions, gasses or electrolyte. Finally, it is understood that the actual composition of the molten electrolyte used during operation of the cell need not be a eutectic composition (as components are sometimes altered to adjust the pH of the melt). It is only required that the composition of the pore-filling material melt at a higher temperature than the temperature of operation and be comprised of materials that do not interfere with operation of the cell.

The invention is susceptible to modifications and alternative forms. For example, any inert material may be used to fill the pores. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
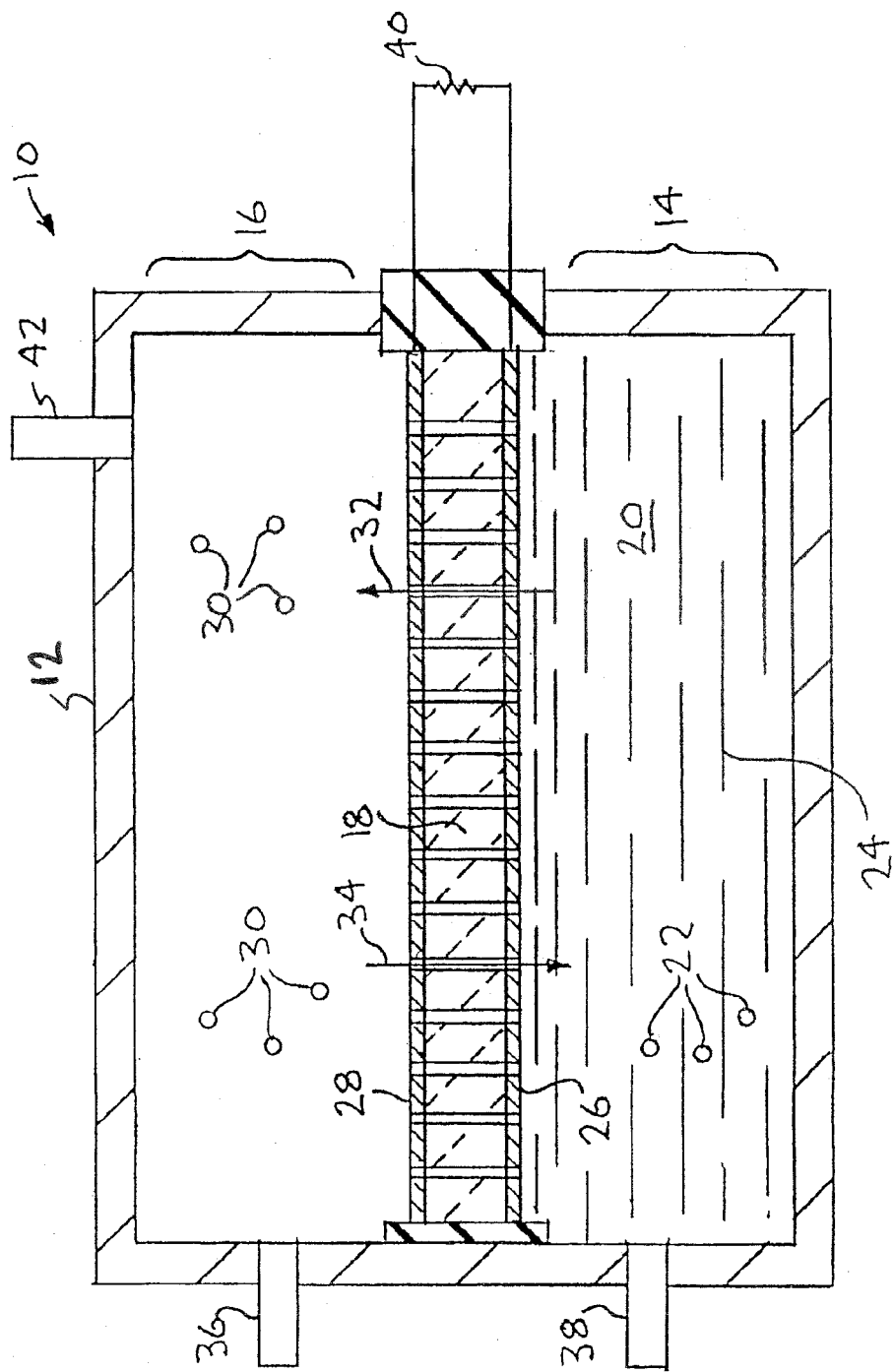
FIG. 1 is a cross-sectioned view of an embodiment of a fuel cell.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

A long held goal of researchers since the early 20th century has been a fuel cell that would convert elemental carbon derived from fossil or biological sources directly to electricity—thereby avoiding combustion and the inefficiencies inherent in the Carnot cycle. It was recognized almost at once that two opposing dependences tended to jeopardize this goal: the carbon electrochemical reaction is sluggish but occurs at higher rates as the temperature is raised from 700 to 800 C; however the Boudouard corrosion reaction ($C+CO_2=2CO$) increases losses of carbon and lowers efficiency to unacceptable levels above about 80° C. Recently, it has been hypothesized that the site of Boudouard corrosion is the carbon/melt or carbon/gas interface within the pores of porous carbon particles used as fuel, or at these interfaces located on the outer surfaces of particles within a packed bed. The obvious counter measures are to lower temperature of operation below about 70° C. (leading to reduced cell voltage output and/or reduced current density), or to increase current density and therefore the polarization on the surface of the particles. Increased polarization is known to impede the Boudouard reaction. The latter counter measure is only partially successful, as the current flow is only partially effective in penetrating the interior of the porous particle or the spaces between particles in a packed bed because of transport or electrical resistance. It is well understood by electrochemists and those skilled in the art that the detrimental effects of Boudouard corrosion of carbon may be described by a number of equivalent representations, as in reference [1] and as discussed below:

Efficient operation requires balanced cathode and anode half reactions to produce a $CO_2$ reaction product by means of the transfer of four electrons per unit of reaction:

$$O_2+2CO_2+4e^-=2CO_3^{2-} \text{ Cathode reaction} \quad (1)$$

$$C+2CO_3^{2-}=3CO_2+4e^- \text{ Anode reaction} \quad (2)$$

$$C+O_2=CO_2 \text{ Net cell reaction}, n=4 \quad (3)$$

One of many possible alternative reactions yielding 2 electrons per mole of carbon may be represented:

$$C+CO_3^{2-}=CO_2+CO+2e^- \text{ Anode reaction}, n=2 \quad (4)$$

Following Coleman and White [2], Hemmes and Cassir [3] made use of matrix algebra techniques to determine the minimum number of chemical equations (three) necessary to describe the complex chemistry of the DCFC anode system under constraints of equilibrium. The carbonate will dissociate at equilibrium according to:

$$CO_3^{2-}=CO_2+O^{2-} \quad (5)$$

Assuming that CO and $CO_2$ concentration in the off gas are independent variables and that the anode system is at equilibrium, then reactions (2) and (4) along with (5) fully describe the anode system, as will any linear combinations of these three. For example, subtracting reaction (2) from twice reaction (4) yields the familiar Boudouard reaction that may occur in the gas phase or gas-saturated melt contacting the carbon:

$$C+CO_2=2CO \quad (6)$$

This equilibrium together with (2) also fully describes the anode half cell in terms of stoichiometry.

It is to be understood that the representation of Boudouard corrosion via (6) on an unpolarized surface is equivalent to the electrochemical reaction of equation (4) on the surface of a polarized electrode.

Carbon air fuel cells have shown total efficiencies of 70-80% under restrictive conditions where the reacting anode surface is polarized in the oxidizing direction by about 0.05- to 0.2 V, and 4 electrons are transferred per atom of carbon (n=4). The major source of loss of efficiency (n<4) is the Boudouard corrosion of carbon ($C+CO_2=2CO$) that takes place on insufficiently polarized portions of the carbon fuel particle bed and of the interior surfaces of a porous fuel particles. This invention describes a technique of using a salt composition having a higher melting point than the fuel cell operating temperature to clog the interior voids within the fuel particle and thereby shut off or substantially impede the transport of $CO_2$ (or current flow producing $CO_2$) to the interior of the porous particle, as necessary for Boudouard corrosion. For example, an off-eutectic composition of the primary melt composition having a melting point (MP) in excess of the operating temperature is introduced into the fuel particles to clog interior voids prior to introduction of the fuel into the cell. As the interior surfaces of the clogged particle are progressively exposed to the electrolyte having the eutectic composition during galvanic discharge of the cell, the solid material is dissolved into the melt. In addition to pore-plugging with off-eutectic compositions of the fuel cell molten electrolyte, other compositions having MP higher than the operating temperature may be used, even if they have constituents other than those of the fuel cell molten electrolyte as long as these constituents are compatible with cell operation.

Referring now to the drawing and in particular to FIG. 1, an embodiment of a fuel cell is illustrated. The fuel cell is designated generally by the reference numeral 10. The fuel cell 10 includes a housing 12 comprised of an anode compartment 14, a cathode compartment 16, and a porous ceramic separator 18 between the anode and cathode compartments. The Anode compartment 14 contains a slurry 20, an electrolyte 24, and an anode current collector 26. The slurry 20 is a mixture of carbon fuel particles 22. The Cathode compartment contains a cathode current collector 28 and an oxygen-containing gas 30.

FIG. 1 shows the fuel cell 10 in a rectangular shape wherein the compartments of the cell are arranged vertically. Other shapes of the fuel cell 10 such as cylindrical and other configurations such as horizontal can perform equally well. The housing 12 can be selected from any non-porous, inert material, such as, a non-reactive ceramic material, e.g., alumina. For large-scale commercial apparatuses, a metal alloy such as stainless steel can be used. To further improve the lifetime of the housing material, the alloy can be coated with a non-reactive material, such as a ceramic, a metal oxide film, or the like.

Electrolyte 24 comprises metal carbonates. A single metal carbonate or a combination of metal carbonates may be used; in particular, mixtures of low melting alkali and/or alkaline earth carbonates are useful. Commonly used carbonates are mixtures of $Li_2CO_3$, $K_2CO_3$, and/or $Na_2CO_3$. The mixture of 38% $Li_2CO_3$, 62% $K_2CO_3$ (molar ratio) as electrolyte 24 is highly effective.

A porous metal structure can serve as anode current collector 26. Anode current collector 26 can comprise a mesh, grid, felt, screen, sintered frit, or other similar electronically-conductive matrix that allows effective contact with and transport of the carbon fuel, salt and $CO_2$ product. In addition, anode current collector 26 comprises any metal or metalloid (e.g., graphite, highly graphitized carbon or a glassy carbon), that cannot melt at the operating temperature of the cell and is stable against corrosion in the molten carbonate salt. Metalloids such as those listed above are particularly effective if sulfur-bearing carbons are used. Ni felt, gold or platinum mesh or a metalloid foam or sponge can be employed as anode current collector 26. Fuel cell 10 effectively performs at a ratio where the surface area of anode current collector 26 to the volume of slurry 20 is less than about 1 cm.

Porous ceramic separator 18 can comprise a cloth, felt, fabric, porous planar plate, porous tubular plate, or other similar structure. Porous ceramic separator 18 is constructed to be capable of transporting dissolved $CO_2$ 32 and carbonate ions 34 between anode compartment 14 and the cathode compartment 16. Separator 18 can comprise a non-reactive metal oxide such as $ZrO_2$, MgO, $LiAlO_2$, CaO, $Al_2O_3$, rare earth oxides, or other similar materials. $ZrO_2$ cloth of about 0.4-1.7 mm thickness or a porous $Al_2O_3$ crucible of about 1.5 mm wall thickness are effective as separator 18.

Cathode current collector 28 normally includes a metal that is in the form of a mesh, grid, felt, screen, sintered frit or other similar structure. Cathode current collector 28 is positioned in contact with an oxygen-containing gas 30 while concurrently in contact with the molten electrolyte 24. The combination of a molten electrolyte in the presence of oxygen creates a very corrosive environment and thus cathode current collector 28 can beneficially contain a corrosion resistant metal such as Ni, Au, Ag, Pt, Pd, Cu, Co, stainless steel, a corrosion resistant alloy, conductive oxides, such as NiO, $LiCoO_2$, $LiFeO_2$, $Li_yNi_{1-x}O$ or other similar material having catalytic properties for oxygen reduction.

An oxygen-containing gas 30 is introduced to the cell through an inlet 36. The oxygen-containing gas 30 comprises air, but alternatively can be an inert gas carrier for oxygen or even pure oxygen. Air performs well and is inexpensive. The diffusion of $CO_2$ from anode chamber to cathode chamber through channels 32 in FIG. 1 is generally to slow to be practical. Therefore the cathode gas 30 will often be introduced with additional $CO_2$ so that an ideal $CO_2$ to oxygen ratio of 2:1 is maintained, as required by reaction (1).

The direct carbon fuel cell reacts particles of elemental carbon derived from fossil or biological sources with oxygen according to the net cell reaction, $C+O_2=CO_2$. The reaction may occur with total efficiencies in the range of 70-80% (referenced to the standard heat of combustion of carbon) in a galvanic cell or in a fuel cell using a molten salt. The carbon fuel is in the form of porous particles typically 0.1-10 mm size entrained in the molten salt liquid representing a highly conductive, low-melting composition. The molten salt is typically comprised of mixed alkali and alkaline earth carbonates, such as the $(Li,K,Na)_2CO_3$ tri-eutectic or the $(K,Na)_2CO_3$ eutectic. The most favorable results (greatest power density) are obtained with highly disordered carbons (as defined by a small characteristic domain of crystallinity and large graphitic plane spacing.) High efficiencies are obtained by anodically polarizing the carbon anode at the melt/electrolyte interface by 0.05-0.2 V positive, at which the desired 4-electron net transfer predominates, resulting in carbon dioxide product according to the net cell reaction, $C+O_2=CO_2$.

Normally, such disordered carbon materials are produced from disordered coal or biological carbon by pyrolysis at low temperatures (<1200 C), which retains both the atomic disorder and the also a porous morphology. However the high porosity assures that the interior of the particles are not subject to the polarization required for efficient anodic dissolution (4-electron net transfer). The interior becomes favored for supporting the competing reaction, the Boudouard reaction (i.e., carbon corrosion): $C+CO_2=2CO$. This is because a given current is distributed over total pore area. Both gas-phase and electrolyte diffusion transport rates in open pores can be quite large at 700-800° C., resulting in substantial losses.

The present invention makes use of an off-eutectic salt composition (same chemical constituents, but with different ratios) that has a melting point higher than the operating temperature (say, by 25° C.). The fuel particle is infused with this off-eutectic composition as a distinct unit process at temperatures of 800-1000° C. Alternatively, infusion may be combined with the pyrolysis of the carbonaceous fuel. On cooling the composition freezes to form a substantially impervious solid barrier that occupies the small-scale porosity and the large-scale structural porosity; fissures formed by contraction upon freezing are filled with the ambient melt by wicking. Upon dissolution, only the surface of the particle is subject to anodic dissolution and 4-electron transfer; the interior is protected against diffusion of $CO_2$, ionic current flow and Boudouard corrosion. As the interior becomes exposed to the surface by continued carbon dissolution, the off-eutectic composition dissolves into the melt, exposing more of the carbon for high-efficiency anodic dissolution.

In this manner, the sites for Boudouard corrosion are occluded by formation of a solid barrier in which the diffusion of $CO_2$ is impeded, and the reaction is confined to the polarized outer surface of the particle producing conditions where coulombic efficiencies approaching 100% can be achieved. An additional benefit of shutting off Boudouard corrosion is that the temperature of operation may be increased, strongly increasing current density and power density, as power density increases significantly as temperature is increased from 725- to 775° C.

The present invention greatly increases the efficiency of all processes that make use of atomically disordered and porous carbon particles. It allows the temperature to be increased from 725 into the range of 750-800° C. which allows increase of the power density into the range of 125-175 mW/cm$^2$.

The direct carbon fuel cell reacts particles of elemental carbon derived from fossil or biological sources with oxygen according to the net cell reaction, $C+O_2=CO_2$. The reaction may occur with total efficiencies in the range of 70-80% (heat of combustion of carbon) in a galvanic cell or in a fuel cell using a molten salt. The carbon fuel is in the form of porous particles typically 0.1-10 mm size entrained in the molten salt liquid representing a highly conductive, low-melting composition. The molten salt is typically comprised of mixed alkali and alkaline earth carbonates, such as the $(Li,K,Na)_2CO_3$ tri-eutectic or the $(K,Na)_2CO_3$ eutectic. (Often the cell molten electrolyte will be selected to differ slightly from that of the eutectic, as required to favorably adjust the acid/base properties of the melt.) The most favorable results (greatest power density) are obtained with highly disordered carbons (small characteristic domain of crystallinity, and large graphitic plane spacing.) High efficiencies are obtained by polarizing the carbon anode by 0.05-0.2 V positive thus decreasing cell voltage by this amount, at which polarization the desired 4-electron net transfer is obtained, resulting in carbon dioxide product according to the net cell reaction, $C+O_2=CO_2$.

Normally, such disordered carbon materials are produced from disordered coal or biological carbon by pyrolysis at low temperatures (<1200 C), which retains both the atomic disorder and the also a porous morphology. However the high porosity assures that the interior of the particles are not subject to the polarization required for efficient anodic dissolution (4-electron net transfer) while the overall or superficial current density (i.e., current divided by cross-sectional area of the electrode) is within a practical range below, for example, 250 mA/cm$^2$. The interior becomes favored for supporting the competing reaction, the reverse Boudouard reaction (or carbon corrosion): $C+CO_2=2CO$. Since gas transport, ionic migration and diffusion of dissolved $CO_2$ rates can each be quite large at 700-800° C., this may result in a substantial loss.

The present invention makes use of an off-eutectic salt composition (same constituents, different ratios) that has a melting point higher than the operating temperature (say, by ~25° C.). The fuel particle is infused with this off-eutectic composition during the process of pyrolysis, at temperatures of 800-1000° C. On cooling the composition freezes to form a solid barrier that occupies the macro-porosity and structural porosity; fissures formed by contraction upon freezing are filled with the eutectic melt by wicking. Upon dissolution, only the surface of the particle is subject to anodic dissolution and 4-electron transfer; the interior is protected against ionic current flow, diffusion of $CO_2$, and Boudouard corrosion. As the interior becomes exposed to the surface by continued carbon dissolution, the off-eutectic composition merely dissolves into the melt, exposing more of the exterior surface of the carbon electrode to high-efficiency anodic dissolution.

The blockage of pores can also be achieved with any inert material, such as salt composition unrelated to the electrolyte melt used in the cell (but compatible with it); or various organic binders such as pitch or coal tar that pyrolyze to form a solid substance (carbon) that provides an effective barrier.

In this manner, the sites for Boudouard corrosion are occluded by formation of a solid barrier in which the diffusion of $CO_2$ is greatly impeded, current flow is impeded and the reaction is confined to the polarized outer surface of the particle producing conditions where coulombic efficiencies approaching 100% can be achieved. An additional benefit of shutting off Boudouard corrosion is that the temperature of operation may be increased, strongly increasing current density and power density, as power density increases substantially as temperature is increased from 725 to 775° C.

EXAMPLES

Figure 2:
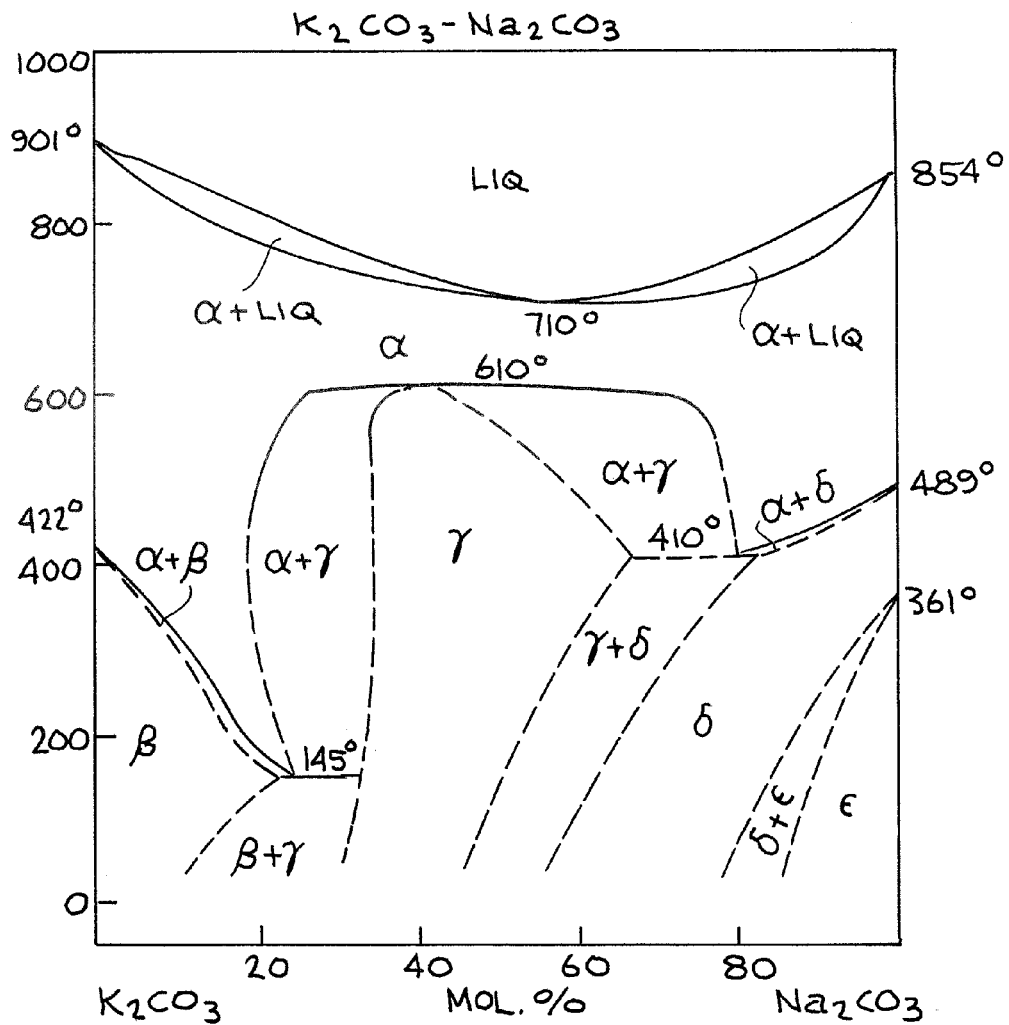
FIG. 2 illustrates an example of an off-eutectic salt composition.

Referring now to FIG. 2 an example of an off-eutectic composition is illustrated. Table 2 provides parameters of an off-eutectic composition that is illustrated in FIG. 2. Note that the composition of the off-eutectic is not unique.

TABLE 1

| Operating T | 750° C. |
|---|---|
| Off-eutectic MP | 775-800° C. |
| Off-eutectic composition | $(K_{0.2}Na_{0.8})_2CO_3$ |

If the porous carbon anode is separated into two batches, and infused with composition points on either side of the eutectic composition melting at 710 C, the proportions of the constituents may be chosen such that upon dissolution the eutectic composition is reproduced and the electrolyte composition thus becomes invariant. For example, if the pore fillers are to be pure $K_2CO_3$ and pure $Na_2CO_3$ and the eutectic composition is 55 mole $Na_2CO_3$ and 45% $K_2CO_3$, then two batches of fuel would be prepared, one with a multiple of 55 moles $Na_2CO_3$ and the other with the same multiple of 45 moles of $K_2CO_3$—i.e., such that the two batches contain the two pure salts in the weight ratio of (55 moles×106 g/mol)/(45 mole×138 g/mol)=0.93 g $Na_2CO_3$/gK2CO$_3$. It is also straight-forward to determine the relative amounts of off-eutectic mixtures of $Na_2CO_3$ and $K_2CO_3$ such that the total amount of both salts forms a eutectic mixture upon solution. It is also straight-forward to determine the relative amounts of off-eutectic mixtures of $Na_2CO_3$ and $K_2CO_3$ such that the total amount of both salts forms an off-eutectic mixture upon solution that may be deemed more favorable from the standpoint of its acid/base properties for cell operation.

Figure 3:
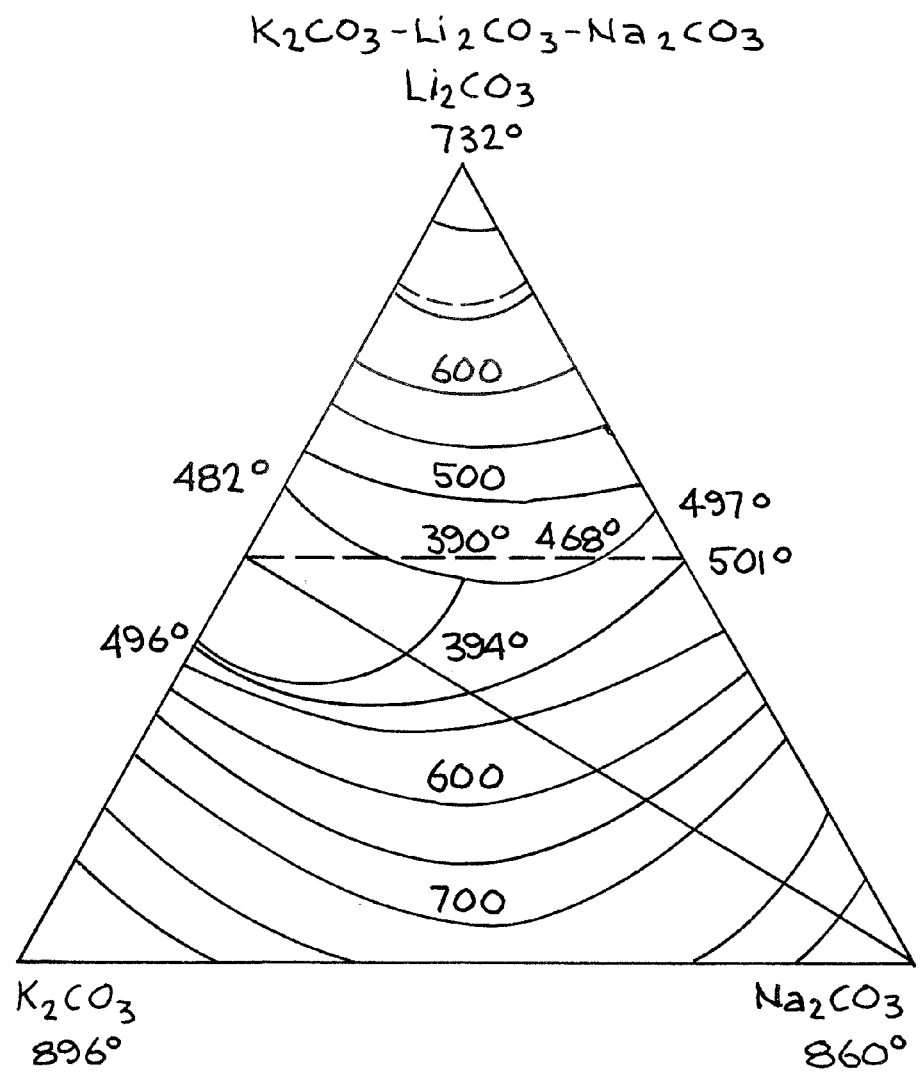
FIG. 3 illustrates another example of an off-eutectic salt composition.

Referring now to FIG. 3 an example of an off-eutectic composition is illustrated. Table 2 provides parameters of the off-eutectic composition that is compatible with the phase diagram of FIG. 3.

TABLE 2

| Operating T | 700° C. |
|---|---|
| Off-eutectic MP | 725° C. |
| Off-eutectic composition | $(K_{0.2}Na_{0.7}Li_{0.1})_2CO_3$ |

Again, the fuel may be divided into batches each with a weighted composition such that when dissolved into the melt, the original composition is maintained, whether it be an eutectic or selected non-eutectic mixture.

Figure 4:
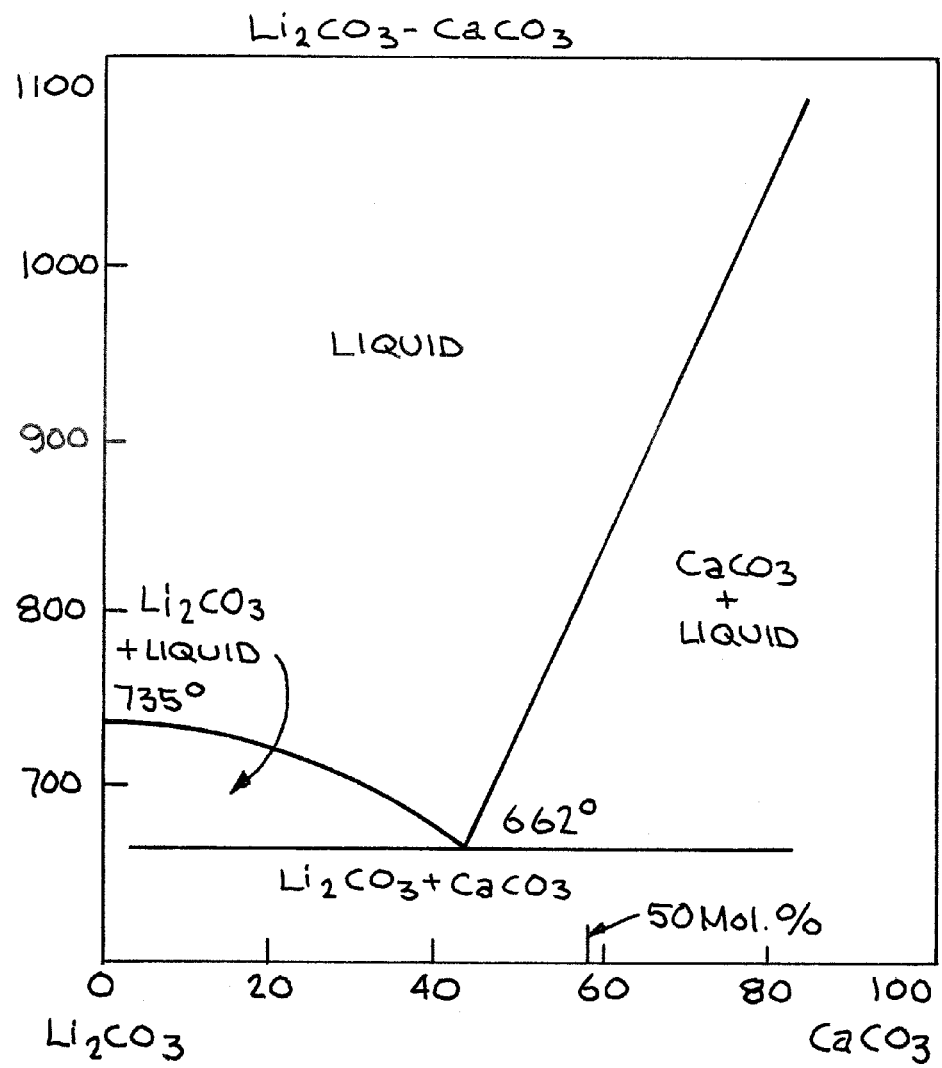
FIG. 4 illustrates yet another example of an off-eutectic salt composition.

Referring now to FIG. 4 an example of an off-eutectic composition is illustrated. Table 3 provides parameters of the off-eutectic composition that is illustrated in FIG. 4.

TABLE 3

| Operating T | 700° C. |
|---|---|
| Off-eutectic MP | 725° C. |
| Off-eutectic Composition | 17 wt-% $CaCO_3$ + 83 wt-% $Li_2CO_3$ |

Again, the eutectic composition of about 42 wt-% $CaCO_3$ may be maintained invariant during cell operation by dividing the feedstock carbon into two batches with compositions from left and from right branches of the eutectic calculated such that the sum of the Li and Ca salts from the two batches reproduces the eutectic upon dissolution.

The present invention greatly increases the efficiency of all processes that make use of atomically disordered and porous carbon particles. It allows the temperature to be increased from about 700° C. into the range of 725-800 C which allows increase of the power density into the range of 125-175 mW/cm$^2$.

To achieve both high coulombic- and voltage efficiencies, it appears necessary to start with highly disordered carbon materials with high specific electronic conductivity. Next, the proportion of current flowing to the exterior electrode surface might be increased by either of two methods: (1) The internal pore volume may be blocked by, for example, filling the pores with a solid, off-eutectic salt composition that melts at a temperature higher than that of cell operation. The salt will dissolve into the electrolyte melt as it becomes exposed by the progressive retraction of the electrode during oxidation. The off-eutectic constituents of different feed-stocks can be balanced on either side of the eutectic composition, so that solution of the plugs result in an invariant melt composition. Pore-blocking techniques can be integrated with anode briquette or plate formation at minimal cost.

High coulombic efficiencies may also be produced from carbon anode fuel that has been infused with off-eutectic or other compatible salt compositions that clog the pores and melt at a temperature higher than the operating temperature; or with organic material, pitch or tar during the pyrolysis of the fuel feedstock consisting of raw fossil or renewable bio-carbons, where such organic material, pitch or tar pyrolyzed to form impervious barriers to transport within the pores. In these cases, the processes of plug formation and pyrolysis of fuel feedstock may be combined into a single step.

Applicant hereby incorporates the following articles into this patent application in their entirety for all purposes by this reference.

[1] Cooper J F and Selman J R, Analysis of the carbon anode in direct carbon conversion fuel cells, Int. J. Hydrogen Energy, April 2012 on line.

[2] Coleman D H, White R E. Linear Algebra used to determine independent half cell equations. J Electrochem Soc 1996; 143(6): 1781.

[3] Hemmes K and Cassir M. A theoretical study of the carbon/carbonate/hydroxide electrochemical system in a direct carbon fuel cell. In: ASME Proc fuel cell science, engineering, and technology; June 2004: No. 2497

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of producing energy using a direct carbon fuel cell protected from Boudouard corrosion, the direct carbon fuel cell having an operating temperature, comprising the steps of:

providing carbon particles that have pores, blocking said pores in said carbon particles by infusing an off-eutectic salt composition into said pores in said carbon particles and filling said pores thereby producing substantially pore-free carbon particles wherein said off-eutectic salt composition has a melting point that is higher than the operating temperature of the direct carbon fuel cell, and reacting said substantially pore-free carbon particles with oxygen at the direct carbon fuel cell operating temperature below said melting point of said off-eutectic salt composition according to the reaction $C+O_2=CO_2$ providing protection from Boudouard corrosion to produce the energy.

2. The method of producing energy of claim 1 wherein said step of providing substantially pore-free carbon particles comprises providing particles that have pores and blocking said pores with an inert material.

3. The method of producing energy of claim 1 wherein said step of providing substantially pore-free carbon particles comprises providing particles that have pores and blocking said pores with organic binders.

4. The method of producing energy of claim 1 wherein said step of providing substantially pore-free carbon particles comprises providing particles that have pores and blocking said pores with pitch or coal tar.

5. The method of producing energy of claim 1 wherein the method of producing energy utilizes pyrolysis of a fuel feed stock and wherein said step of blocking said pores in said carbon particles by infusing an off-eutectic salt composition into said pores in said carbon particles thereby producing substantially pore-free carbon particles comprises infusing the direct carbon fuel cell fuel particles with an off-eutectic salt composition during the pyrolysis of the fuel feedstock.

6. The method of producing energy of claim 1 wherein the method of producing energy utilizes pyrolysis of a fuel feed stock and wherein said step of blocking said pores in said carbon particles by infusing an off-eutectic salt composition into said pores in said carbon particles thereby producing substantially pore-free carbon particles comprises infusing said pores in said carbon particles with an off-eutectic salt composition during the pyrolysis of the fuel feedstock at temperatures of 800-1000° C.

* * * * *